United States Patent
Bando et al.

[11] Patent Number: 5,827,121
[45] Date of Patent: Oct. 27, 1998

[54] HOMOKINETIC UNIVERSAL JOINT HAVING STRAIGHT RECIRCULATING BALL PATHS IN FLAT SIDE SURFACES OF TRACK GROOVES

[75] Inventors: Hiromichi Bando, Iwata; Tetsuro Kadota, Iwata-gun; Takeshi Kohara, Iwata, all of Japan

[73] Assignee: NTN Corporation, Osaka, Japan

[21] Appl. No.: 363,236

[22] Filed: Dec. 23, 1994

[51] Int. Cl.⁶ ........................................ F16D 3/205
[52] U.S. Cl. ................................ 464/111; 464/168
[58] Field of Search ................................ 464/111, 168, 464/905, 122, 120; 384/45, 43

[56] References Cited

U.S. PATENT DOCUMENTS

| | | | |
|---|---|---|---|
| 2,983,120 | 5/1961 | White | 464/168 |
| 4,684,356 | 8/1987 | Kimata et al. | 464/111 |
| 4,708,693 | 11/1987 | Orain | 464/111 |
| 4,840,600 | 6/1989 | White et al. | 464/111 |
| 4,955,847 | 9/1990 | Orain | 464/111 |
| 5,061,223 | 10/1991 | Kadota et al. | 464/111 |
| 5,073,144 | 12/1991 | Stenglein et al. | 464/111 |
| 5,098,342 | 3/1992 | Mizukoshi | 464/111 |

*Primary Examiner*—Daniel P. Stodola
*Assistant Examiner*—William A. Rivera
*Attorney, Agent, or Firm*—Nikaido, Marmelstein, Murray & Oram LLP

[57] ABSTRACT

A slide type homokinetic universal joint which assures low slide resistance. A guide block is supported on each trunnion so as to be axially slidable with respect to the trunnion and so as for the trunnion to be pivotable with respect to the guide block. A ball circulation groove including a pair of straight paths is formed in each side of the guide block. Each track groove formed in the outer ring has flat sides. An arcuate ball rolling surface is formed at the outer-diameter side of each flat side of the track groove so as to smoothly connect with the flat side, so that the balls can smoothly circulate in the ball circulation groove.

4 Claims, 6 Drawing Sheets

HOMOKINETIC UNIVERSAL JOINT HAVING STRAIGHT RECIRCULATING BALL PATHS IN FLAT SIDE SURFACES OF TRACK GROOVES

BACKGROUND OF THE INVENTION

This invention relates to a sliding type homokinetic universal joint mainly for use in an automobile.

A tripod homokinetic universal joint is a typical sliding type homokinetic universal joint. Conventional tripod homokinetic universal joints have one serious drawback. Namely, while torque is being transmitted with the shaft of the tripod member, which is mounted in the outer ring, forming a certain working angle with respect to the shaft of the outer ring, the spherical-surfaced rollers supported on the trunnions of the tripod member get inclined relative to the track grooves formed in the outer ring. Thus, the rollers plunge and thus slip while rolling relative to the track grooves. If the rollers slip in the track grooves, axial thrust is produced, which in turn causes vibration and heat buildup.

In an attempt to solve this problem, the present applicant proposed a tripod type homokinetic universal joint as shown in FIGS. 11 and 12 (Unexamined Japanese Patent Publication 3-113123). It has an outer ring 30 formed in its inner periphery with three track grooves 31, while a tripod member 32 mounted in the outer ring 30 has three trunnions 33. A spherical bush 34 is slidably mounted on each trunnion 33. A guide block 35 is mounted on each spherical bush 34. A ball circulation groove 37 having straight portions 36 is formed in either side of each guide block 35. Each ball circulation groove 37 rollably accommodates a plurality of balls 38. Raceway grooves 39 are formed in both sides of the track grooves 31 to guide the balls 38 while they are moving along the straight portions 36.

While this homokinetic universal joint is taking a working angle, the spherical bushes 34 will slip relative to the guide blocks 35 while the latter are kept in fixed positions. Thus, when transmitting torque with the homokinetic universal joint taking a working angle, the guide blocks 35 move along the track grooves 31 while keeping their position unchanged, whereas the balls 38 roll and circulate in the ball circulation grooves 37 while being guided by the raceway grooves 39. Slide resistance is thus extremely small.

However, the homokinetic universal joint shown in FIGS. 11 and 12 has one problem. When the balls 38 move from one straight portion 36 to the other through the curved connecting portion, they have to ride over a shoulder portion 40 of the raceway groove 39. Thus, the shoulders 40 may interfere with the balls 38, making it difficult for the ball 38 to circulate smoothly in the grooves 37.

An object of this invention is to improve this type of homokinetic universal joint in which the balls can be circulated smoothly and thus the slide resistance can be reduced.

SUMMARY OF THE INVENTION

According to this invention, there is provided a homokinetic universal joint comprising an outer ring formed with three axial track grooves in inner peripheral surface thereof, a tripod member having three trunnions and inserted in the outer ring, and a guide block supported on each trunnion so as to be axially slidable with respect to the trunnion and so as for the trunnion to be pivotable with respect to the guide block, each guide block being formed with a ball circulation groove in each side thereof, each ball circulation groove having an elliptical shape and comprising a straight load-bearing path and a straight non-load-bearing path, both extending parallel to the axis of the outer ring, and semi-circular paths connecting the straight paths together at ends thereof, and a plurality of balls accommodated in each ball circulation groove so that they can roll and circulate therein, each track groove being formed with a pair of flat surfaces facing the sides of the respective guide block and a pair of arcuate ball raceways smoothly connecting with the flat surfaces for guiding the balls in the ball circulation groove while they are moving in the load-bearing path.

According to the present invention, each track groove is formed with flat surfaces which face the respective sides of the guide block, and arcuate ball raceways smoothly connecting with the flat surfaces. Thus, while the balls are moving from the load-bearing path to the semicircular path, they are guided by the flat surface. Thus, the movement of balls is very smooth even while the homokinetic universal joint is taking a working angle. Thus, the slide resistance of the homokinetic universal joint decreases dramatically.

Moreover, when compared with the prior arrangement in which ball guide raceway grooves are formed in the sides of the track grooves, the track grooves formed in the outer ring according to the invention are much simpler in shape, so that the outer ring can be formed easily by forging.

In one embodiment, the depth of the non-load-bearing path of the ball circulation groove is greater than the radius of the balls. This makes it possible to effectively prevent the balls from getting stuck in the space between the guide block and the track groove of the outer ring.

Other features and objects of the present invention will become apparent from the following description made with reference to the accompanying drawings, in which:

DETAILED DESCRIPTION OF THE PREFERRED EMBODIMENT

Figure 1:
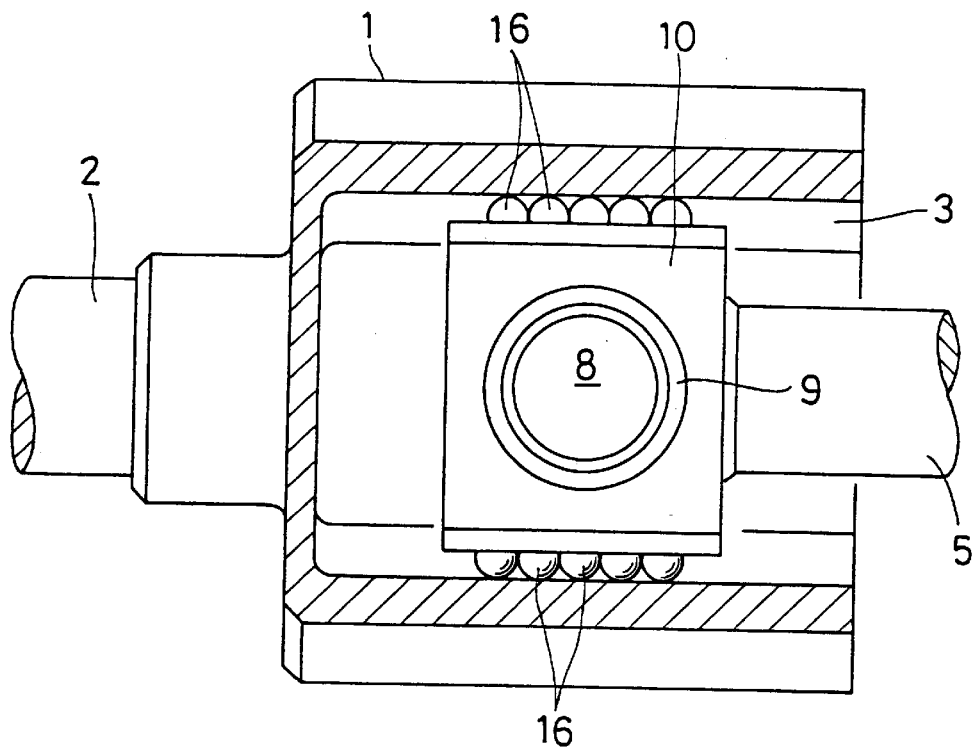
FIG. 1 is a cross-sectional plan view of one embodiment of the homokinetic universal joint according to the invention.
Figure 2:
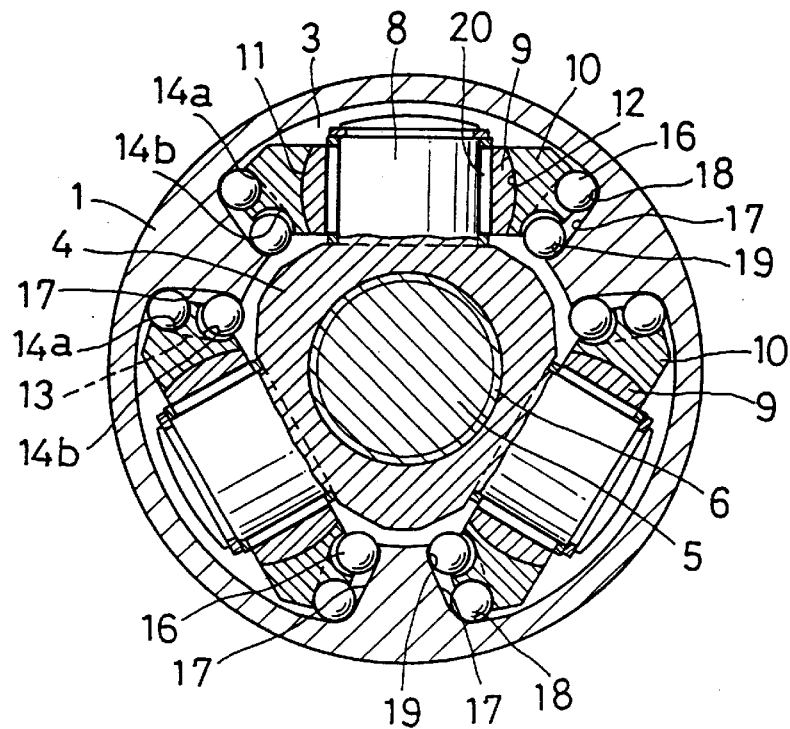
FIG. 2 is a vertical sectional side view of the same.
Figure 3:
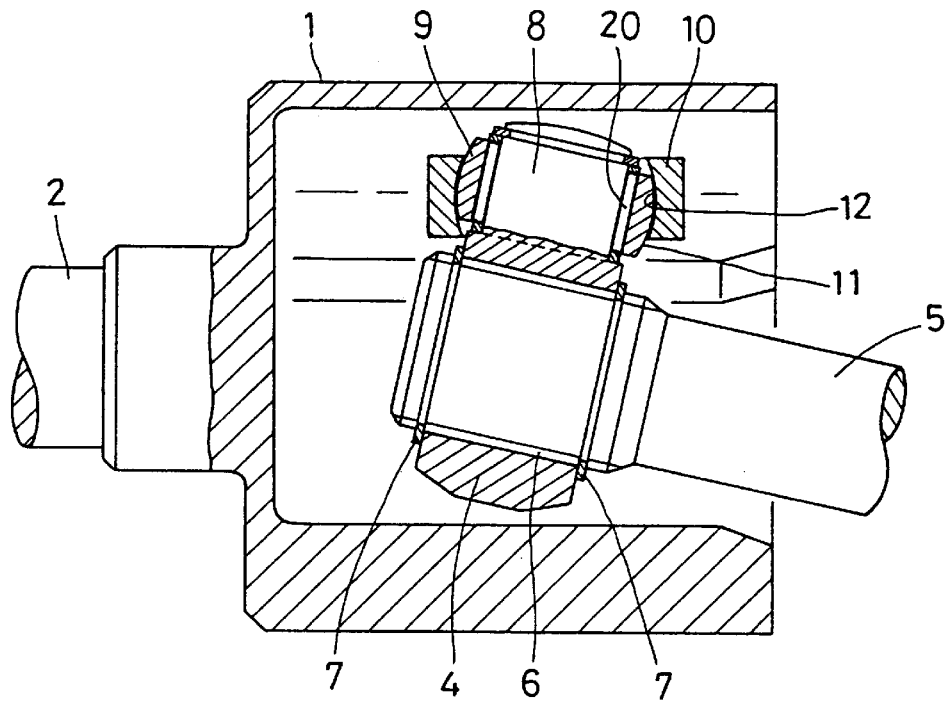
FIG. 3 is a vertical sectional front view of the same showing one operational state.
Figure 4:
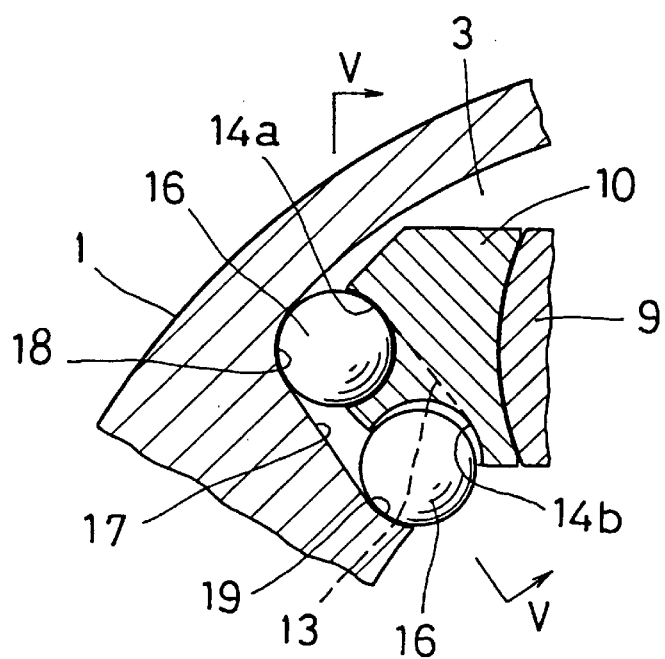
FIG. 4 is an enlarged sectional view of a portion of the same.

As shown in FIGS. 1 to 3, an outer ring 1 has a closed end on which is provided a first shaft 2. Three axial track grooves 3 are formed in the inner periphery of the outer ring 1 at intervals of 120 degrees (FIG. 2).

A tripod member 4 inserted in the outer ring 1 is mounted on a second shaft 5 through serrations 6 so as to be rotatable together with the second shaft 5. Snap rings 7 are put on the second shaft 5 to prevent axial movement of the tripod member 4 along the shaft 5 (FIG. 3).

The tripod member 4 has three trunnions 8 each carrying a spherical bush 9 so as to be rotatable about and axially slidable relative to the trunnion 8.

Mounted on each spherical bush 9 is a guide block 10 having a spherical inner surface 12 kept in contact with and being guided by a spherical outer surface 11 of the bush 9. A ball circulation groove 13 is formed in either side of each guide block 10.

Figure 5:
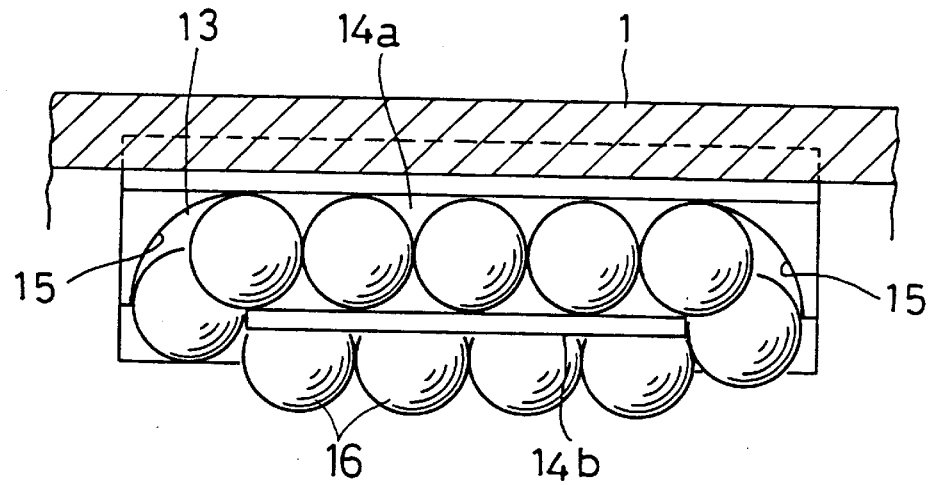
FIG. 5 is a sectional view taken along line V—V of FIG. 4.

As shown in FIG. 5, the ball circulation groove 13 has an elliptical shape and comprises two straight paths that run parallel to the axis of the outer ring 1, i.e. a load-bearing path 14a and a non-load-bearing path 14b, and arcuate portions 15 through which the straight paths are connected together. A plurality of balls 16 are rollably mounted in the ball circulation groove 13.

Both side faces of the track grooves 3 are flat surfaces 17 which are somewhat inclined with respect to the side faces of the guide blocks 10. An arcuate ball raceway 18 is formed at the outer-diameter side of each flat surface 17 so as to smoothly connect to the flat surface 17 to guide the balls 16 while they are moving in the load-bearing path 14a. On the inner-diameter side of each flat surface 17 is formed a ball guide surface 19 to prevent dropout of the balls 16. The distance between the ball guide surface 19 and the bottom of the non-load-bearing path 14b is greater than the outer diameter of the balls 16. Thus, when transmitting torque between the outer ring 1 and tripod member 4, the balls 16 in the non-load-bearing path 14b are kept free from load.

We shall now describe its operation. When the second shaft 5 takes a working angle with respect to the first shaft 2, the trunnions 8 and thus the spherical bushes 9 are inclined relative to the longitudinal direction of the track grooves 3.

In this state, the guide blocks 10 are prevented from turning by the engagement between the balls 16 in each load-bearing path 14a and the ball raceway 18. Thus, when the spherical bushes 9 incline, slip occurs between the bushes 9 and the respective guide blocks 10.

Also, when the first shaft 2 and second shaft 5 are inclined relative to each other, the trunnions 8 and the spherical bushes also move relative to each other. In order to allow the trunnions 8 and the spherical bushes 9 to move smoothly relative to each other, a plurality of needles 20 are provided therebetween.

When transmitting torque with the homokinetic universal joint taking a working angle, the trunnion 8 and the spherical bush 9 can pivot in and with respect to the guide block 10. On the other hand, the guide blocks 10 move in the longitudinal direction of the track grooves 3 while keeping their positions unchanged. As the guide blocks 10 move, the balls 16 in each load-bearing path 14a roll along the ball raceway 18 and circulate along the ball circulation groove 13.

Since the ball raceways 18 for guiding the movement of the load-bearing balls 16 smoothly connect the flat surfaces 17, the balls 16 can move smoothly from the load-bearing path 14a to the arcuate connecting path 15. Thus, the balls can smoothly circulate in the ball circulation groove 13, so that little slide resistance will be produced between the outer ring 1 and the tripod member 4. This permits smooth torque transmission between the first shaft 2 and the second shaft 5.

Figure 6A:
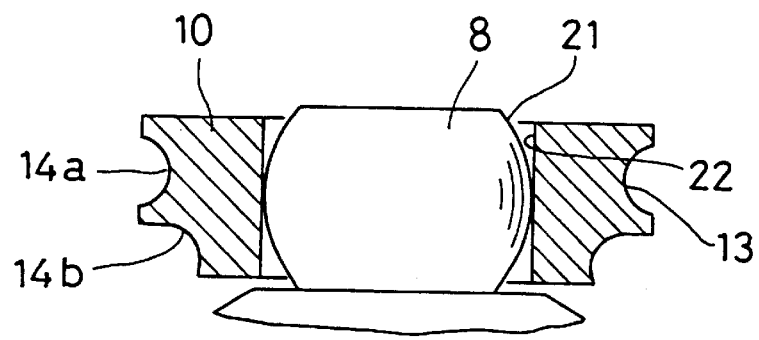
FIGS. 6A and 6B are sectional views showing modified guide blocks.
Figure 6B:
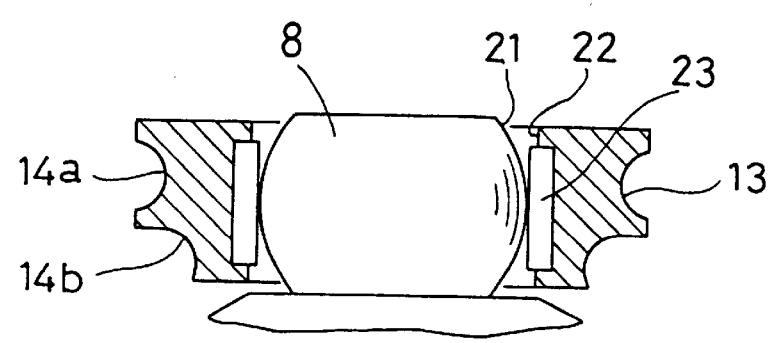

In the embodiment shown in FIG. 1, the guide blocks 10 are supported on the spherical bushes 9 so as to allow the trunnions to pivot in the guide blocks 10. They may be supported in different ways. For example, the guide block 10 shown in FIG. 6A has a cylindrical inner surface 22 kept in contact with and guided by a spherical outer surface 21 of the trunnion 8. As shown in FIG. 6B, in order to reduce the contact resistance between the trunnion 8 and the guide block 10, needles 23 may be mounted therebetween.

FIGS. 7 through 10 show other embodiments of the invention.

In the embodiment shown in FIGS. 7–10, each guide block 10 has a cylindrical inner surface 22 which is kept in contact with and guided by a spherical outer surface 11 of the bush 9 so that the bush can pivot with respect to the guide block 10.

The non-load-bearing path 14b and the connecting path 14c of the ball circulation groove 14 in this embodiment have a generally U-shaped cross-section comprising a semicircular portion 24 substantially complementary in shape to the cross-section of the balls 16, and short straight portions 25 that extend in tangential directions from both ends of the semicircular portion 24. The groove depth is greater than the radius of balls 16.

Also, the distance between the bottom of the non-load-bearing path 14b and the flat surface 17 of the track groove 3 is greater than the outer diameter of the balls 16.

Thus, the balls 16 will never drop out while they are moving in the non-load-bearing path 14. Thus, in this embodiment, the ball guide surface 19 as shown in FIG. 2 is not necessary.

Since no ball guide surface is necessary, the inner peripheral shape of the outer ring 1 can be simplified. This makes it possible to form the outer ring 1 by cold forging.

Figure 8:
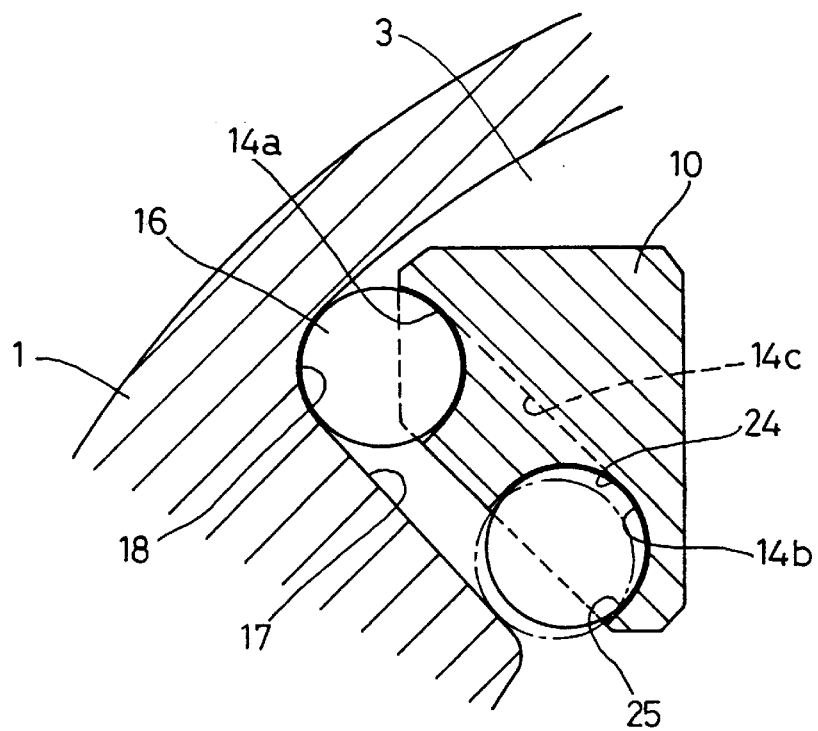
FIG. 8 is an enlarged sectional view of a portion of the same.
Figure 9:
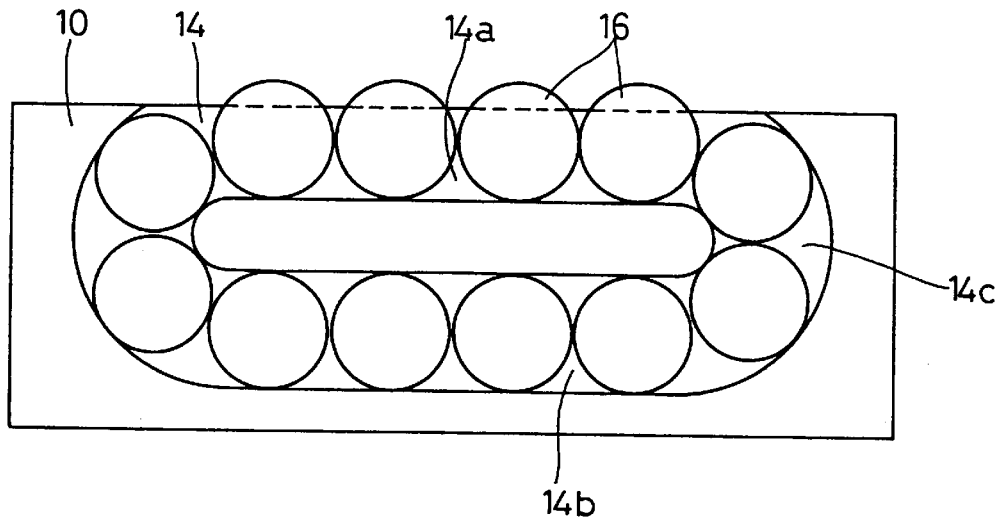
FIG. 9 is a front view of its track groove.

Also, since the non-load-bearing path 14b and the connecting path 14c are greater in depth than the radius of the balls, even if same balls 16 are pushed by the other balls and brought into point-contact with the flat surface 17 as shown by chain line in FIG. 8 while moving from the load-bearing path 14a through the connecting path 14c to the non-load-bearing path 14b, these balls 16 are also in point-contact with one of the flat surfaces 25 of the non-load-bearing path 14b. Thus, it will never get stuck between the inner surface of the track groove 3 and the guide block 11. Thus, there will be no increase in thrust force.

Figure 10:
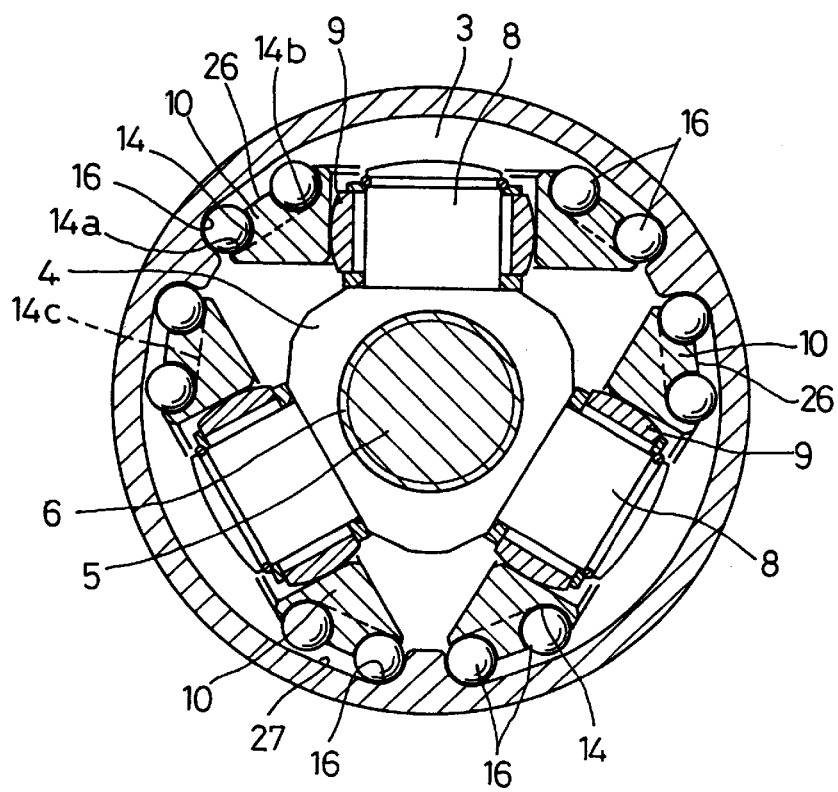
FIG. 10 is a vertical sectional side view of a still another embodiment.
Figure 11:
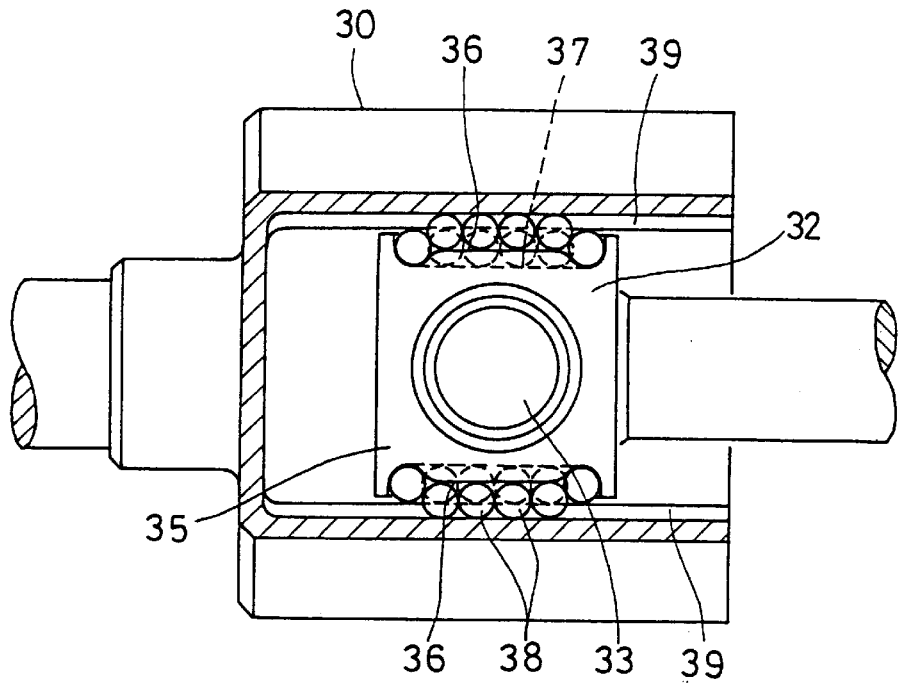
FIG. 11 is a plan view in transverse section of a conventional homokinetic universal joint.
Figure 12:
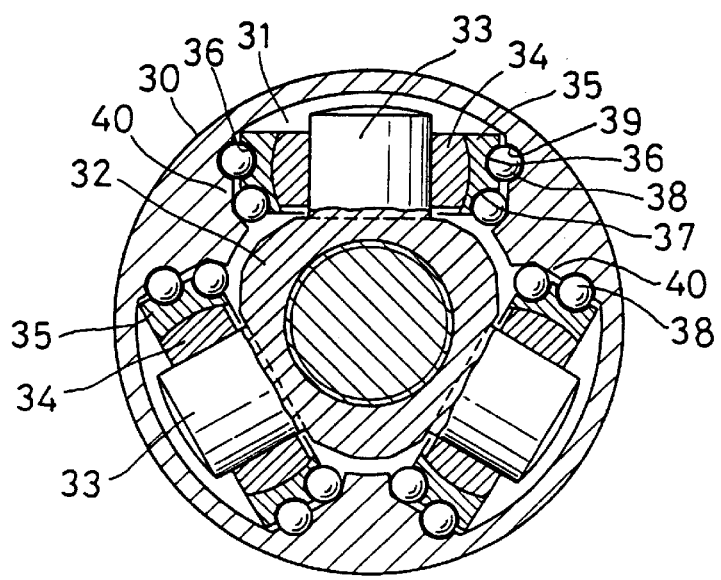
FIG. 12 is a vertical sectional side view of the same.

In the embodiment shown in FIG. 10, each guide block 10 has tapered surfaces 26 on both sides thereof at its outer periphery. A ball circulation groove 14 is formed in each tapered surface 26.

Similar to the other embodiments, the ball circulation groove 14 has an elliptical shape comprising a straight load-bearing path 14a and non-load-bearing path 14b, and arcuate paths 14c connecting the ends of the paths 14a and 14b together. The non-load-bearing path 14b and the arcuate paths 14c are of the same shape as those in the embodiment shown in FIGS. 7 and 8.

Also, flat surfaces 27 are formed at each end of each track groove 3. Each flat surface 27 is slightly inclined relative to the plane including the centers of the plurality of balls 16 in the ball circulation groove 14 to provide a gap wider than the diameter of the balls 16 between the non-load-bearing path 14b and the flat surface 27.

Figure 7:
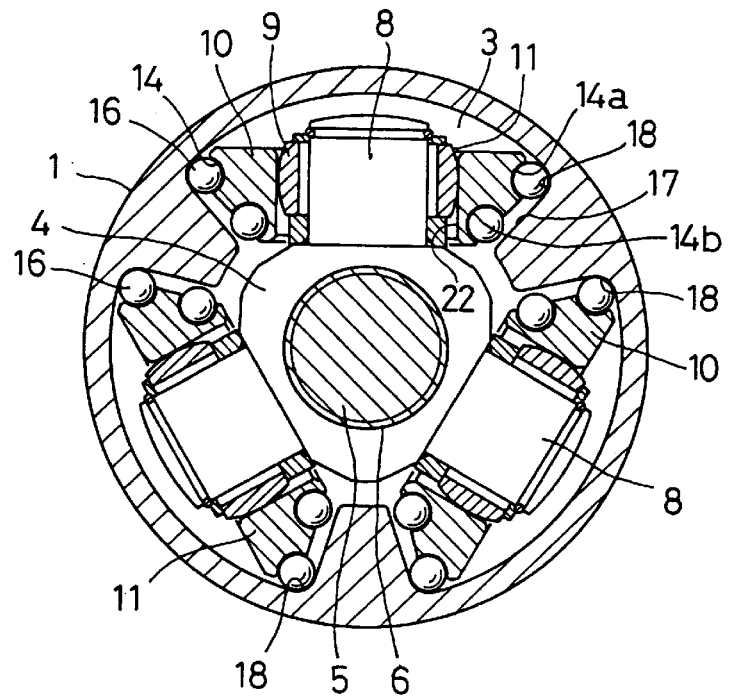
FIG. 7 is a sectional view of another embodiment of the homokinetic universal joint according to the invention.

In the embodiment shown in FIG. 10, similar to the embodiment shown in FIG. 7, the balls 16 are prevented from getting stuck between the inner surface of the track groove 3 and the guide block 10.

Though not shown in the figures, each guide block may have tapered surfaces sloped in opposite directions at its outer- and inner-diameter sides, as shown in FIG. 2, with the ball circulation groove shown in FIG. 10 formed in the slope at the outer-diameter side and the ball circulation groove shown in FIG. 7 formed in the slope at the inner-diameter end.

What is claimed is:

1. A homokinetic universal joint comprising an outer ring formed with three axial track grooves in inner peripheral surface thereof, a tripod member having three trunnions, each inserted in a respective one of said track groove and a guide block supported on each of said trunnions so as to be axially slidable with respect to said trunnion and so as for said trunnion to be pivotable with respect to said guide block, each of said guide blocks being formed with a ball circulation groove in each side thereof, each of said ball circulation grooves having an elliptical shape and comprising a straight load-bearing path and a straight non-load-bearing path, both extending parallel to the axis of said outer ring, and semicircular paths connecting said straight paths together at ends thereof, and a plurality of balls accommodated in each of said ball circulation grooves so that said plurality of balls roll and circulate therein, each of said track grooves being formed with a pair of flat side surfaces extending radially inward and facing the sides of said respective guide block and a circumferential surface connecting said side flat surfaces and a load bearing path at the intersection of the flat side surface and the circumferential surface, said bearing path of the track groove includes a pair of arcuate ball raceways smoothly connecting with said flat side surfaces for guiding said balls in said ball circulation groove while they are moving in said load-bearing path.

2. A homokinetic universal joint as claimed in claim 1 wherein a spherical bush is mounted between said each trunnion and said guide block so as to, be rotatable about and axially slidable relative to said trunnion.

3. A homokinetic universal joint as claimed in claim 1 or 2 wherein the depth of said non-load-bearing path of said each ball circulation groove of said guide block is greater than the radius of said balls, and wherein the distance between the bottom of said non-load-bearing path of said guide block and said flat side surface of said track grooves is greater than the diameter of said balls.

4. A homokinetic universal joint as claimed in claim 3 wherein said non-load-bearing path of said guide block has a U-shaped cross-section comprising a semicircular portion substantially complementary in shape to the contour of said balls, and two short straight portions extending tangentially from both ends of said semicircular portion.

* * * * *